US011098834B2

(12) United States Patent
Clapper et al.

(10) Patent No.: US 11,098,834 B2
(45) Date of Patent: Aug. 24, 2021

(54) SYSTEM, METHOD AND APPARATUS FOR DEBRIS SHIELD FOR SQUEEZE-ACTIVATED RETAINER FOR A CONDUIT

(71) Applicant: North American Pipe Corporation, Houston, TX (US)

(72) Inventors: Joshua E. Clapper, Downingtown, PA (US); Dmitry Yashin, Haverford, PA (US); Roy L. Dean, Schwenksville, PA (US)

(73) Assignee: NORTH AMERICAN PIPE CORPORATION, Houston, TX (US)

( * ) Notice: Subject to any disclaimer, the term of this patent is extended or adjusted under 35 U.S.C. 154(b) by 205 days.

(21) Appl. No.: 16/134,561

(22) Filed: Sep. 18, 2018

(65) Prior Publication Data

US 2019/0086010 A1    Mar. 21, 2019

Related U.S. Application Data

(60) Provisional application No. 62/560,045, filed on Sep. 18, 2017.

(51) Int. Cl.
*F16L 47/08* (2006.01)
*F16L 37/084* (2006.01)
(Continued)

(52) U.S. Cl.
CPC ........... *F16L 47/08* (2013.01); *F16L 37/0845* (2013.01); *F16L 37/0885* (2019.08); *F16L 55/1286* (2013.01); *F16L 2201/10* (2013.01)

(58) Field of Classification Search
CPC ... F16L 37/0885; F16L 37/0845; F16L 47/08; F16L 55/1286; F16L 2201/10; F16L 37/088
See application file for complete search history.

(56) References Cited

U.S. PATENT DOCUMENTS 738,503 A    9/1903  Waters
1,073,850 A    9/1913  Greer
(Continued)

FOREIGN PATENT DOCUMENTS

DE    202011107042 U1 *  1/2013  .......... F16L 37/0885
EP    0941411 A2    9/1999
WO    9825035 A2    6/1998

OTHER PUBLICATIONS

European Search Report cited in corresponding European app No. 18748248.4; dated Nov. 2, 2020; 11 pp.
(Continued)

*Primary Examiner* — Matthew Troutman
*Assistant Examiner* — James A Linford
(74) *Attorney, Agent, or Firm* — Lempia Summerfield Katz LLC (57) ABSTRACT

An assembly includes a tubular body having an axis, an axial end, a bore that is axial an aperture and a retainer groove formed in the bore and contiguous with the aperture. The assembly also includes a retainer mounted in the retainer groove. The retainer has a debris shield located external to the tubular body. The retainer includes a nominal configuration wherein the debris shield is configured to close off access to the aperture and the retainer groove to prevent debris from accumulating therein. In addition, the retainer includes an expanded configuration wherein the debris shield is not configured to completely close off access to the aperture and the retainer groove.

16 Claims, 13 Drawing Sheets

(51) Int. Cl.
*F16L 55/128* (2006.01)
*F16L 37/088* (2006.01)

(56) References Cited

U.S. PATENT DOCUMENTS

| | | | |
|---|---|---|---|
| 1,771,949 A | 7/1930 | Blanchard | |
| 2,410,027 A | 10/1946 | Guildford | |
| 2,453,597 A * | 11/1948 | Sarver | F16L 37/0885 285/277 |
| 2,479,960 A | 8/1949 | Osborn | |
| 2,805,089 A | 9/1957 | Hansen | |
| 2,898,130 A | 8/1959 | Hansen | |
| 2,950,132 A | 8/1960 | Michael | |
| 3,151,891 A | 10/1964 | Sanders | |
| 3,314,696 A | 4/1967 | Ferguson | |
| 3,381,983 A | 5/1968 | Hanes | |
| 3,455,578 A | 7/1969 | Hanes | |
| 3,521,911 A * | 7/1970 | Hanes | E21B 17/085 285/27 |
| 3,574,362 A | 4/1971 | Gregg | |
| 3,603,619 A | 9/1971 | Bengesser et al. | |
| 3,606,402 A | 9/1971 | Medney | |
| 3,637,239 A | 1/1972 | Daniel | |
| 3,920,270 A | 11/1975 | Babb, Jr. | |
| 3,948,548 A | 4/1976 | Voss | |
| 4,007,953 A | 2/1977 | Powell | |
| 4,063,760 A | 12/1977 | Moreiras | |
| 4,226,445 A | 10/1980 | Kramer | |
| 4,426,105 A | 1/1984 | Plaquin | |
| 4,603,886 A | 8/1986 | Pallini, Jr. | |
| 4,804,206 A | 2/1989 | Wood | |
| 4,813,716 A * | 3/1989 | Lalikos | F16L 37/0885 285/148.14 |
| 4,854,764 A | 8/1989 | Faber | |
| 4,874,174 A | 10/1989 | Kojima | |
| 4,884,829 A | 12/1989 | Funk | |
| 5,098,241 A | 3/1992 | Aldridge | |
| 5,226,682 A | 7/1993 | Marrison | |
| 5,498,042 A | 3/1996 | Dole | |
| 5,662,360 A | 9/1997 | Guzowski | |
| 5,671,955 A | 9/1997 | Shumway | |
| 5,704,658 A * | 1/1998 | Tozaki | F16L 37/0885 285/305 |
| 5,749,603 A | 5/1998 | Mann | |
| 5,758,909 A | 6/1998 | Dole | |
| 5,816,625 A | 10/1998 | Clarke | |
| 5,819,376 A | 10/1998 | Kovalsky | |
| 5,864,926 A | 2/1999 | Gyoengyoesi | |
| 5,876,071 A | 3/1999 | Aldridge | |
| 6,062,611 A | 5/2000 | Percebois | |
| 6,102,447 A | 8/2000 | Aldridge | |
| 6,183,020 B1 | 2/2001 | Luft | |
| 6,186,557 B1 | 2/2001 | Funk | |
| 6,302,445 B1 | 10/2001 | Kugele | |
| 6,305,889 B1 | 10/2001 | Blessing | |
| 6,386,596 B1 | 5/2002 | Olson | |
| 6,438,801 B1 | 8/2002 | Yamada | |
| 6,473,943 B1 | 11/2002 | Thacker | |
| 6,530,604 B1 | 3/2003 | Luft | |
| 7,243,954 B2 | 7/2007 | Toshima | |
| 7,284,310 B2 | 10/2007 | Jones et al. | |
| 7,537,248 B2 | 5/2009 | Jones et al. | |
| 8,127,406 B2 | 3/2012 | Morita | |
| 8,157,296 B2 | 4/2012 | Ullrich | |
| 8,267,435 B2 | 9/2012 | Hellfeier | |
| 8,764,067 B2 | 7/2014 | Bundy | |
| 2002/0185864 A1 | 12/2002 | Lemay | |
| 2003/0001386 A1 | 1/2003 | Cresswell | |
| 2003/0057699 A1 | 3/2003 | Persohn | |
| 2003/0168854 A1 | 9/2003 | Lebreton | |
| 2003/0234536 A1 | 12/2003 | Riedy | |
| 2004/0056484 A1 | 3/2004 | Kwon | |
| 2004/0070197 A1 | 4/2004 | Densel | |
| 2007/0152444 A1 | 7/2007 | Kertesz | |
| 2007/0176421 A1 | 8/2007 | Meier | |
| 2007/0246936 A1 | 10/2007 | Jeltsch | |
| 2009/0256354 A1 | 10/2009 | Ullrich | |
| 2010/0001515 A1 | 1/2010 | Suzuki | |
| 2010/0019490 A1 | 1/2010 | Udo | |
| 2011/0278835 A1 | 11/2011 | Kishi | |
| 2012/0038149 A1 | 2/2012 | Lee | |
| 2014/0191504 A1 | 7/2014 | Wu | |
| 2015/0084329 A1 | 3/2015 | Freudendahl | |
| 2017/0146168 A1 | 5/2017 | Caprio et al. | |
| 2018/0135787 A1 | 5/2018 | Badhorn et al. | |

OTHER PUBLICATIONS

ISR 04052018, International Search Report cited in corresponding International application No. PCT/US2018/016689; dated Apr. 5, 2018; 3 pp.
Written Opinion 04052018, Written Opinion of the International Searching Authority cited in corresponding International application No. PCT/US2018/016689; dated Apr. 5, 2018; 4 pp.
Examiner's Requisition 11042019, Examiner's Requisition cited in corresponding Canadian application No. 3,017,732; dated Nov. 4, 2019; 5 pp.
English translation of the Chinese Office Action cited in the Chinese application No. 201880023756.4; dated Oct. 12, 2020; 20 pp.
Examination Report cited in corresponding Indian patent application No. 201814003844; dated May 12, 2021; 6 pp.

* cited by examiner

SYSTEM, METHOD AND APPARATUS FOR DEBRIS SHIELD FOR SQUEEZE-ACTIVATED RETAINER FOR A CONDUIT

CROSS-REFERENCE TO RELATED APPLICATIONS AND CLAIM OF PRIORITY

The present application claims priority to U.S. Provisional Patent Application Ser. No. 62/560,045, filed Sep. 18, 2017, entitled "SYSTEM, METHOD AND APPARATUS FOR DEBRIS SHIELD FOR SQUEEZE-ACTIVATED RETAINER FOR A CONDUIT." The content of the above-identified patent documents are incorporated herein by reference.

TECHNICAL FIELD

The present invention relates in general to pipes and, in particular, to a system, method and apparatus for a debris shield for a squeeze-activated retainer for a conduit.

BACKGROUND OF THE INVENTION

Conventional spline-type, restrained pipe joint systems typically have splines that are separate from the pipes. The splines can be lost during transportation or disassembly. Examples of such designs include U.S. Pat. Nos. 5,662,360, 7,284,310, and 7,537,248. There are no "push to lock" type pipe joints that rely on a spline that automatically "expands" to open, and then snaps into place. Some users would prefer a quicker installation of restrained joint pipe that does not require "reversibility" (i.e., the ability to take the joint apart after assembly), and yet still provide a robust pipe joint system. Thus, improvements in pipe restrained joints continue to be of interest.

SUMMARY

Embodiments of a system, method, assembly and apparatus for a debris shield for a squeeze-activated retainer for a conduit are disclosed. For example, an assembly includes a tubular body having an axis, an axial end, a bore that is axial an axial end, a retainer groove formed in the bore and contiguous with the aperture. The assembly also includes a retainer mounted in the retainer groove. The retainer has a debris shield located external to the tubular body. The retainer includes a nominal configuration wherein the debris shield is configured to close off access to the aperture and the retainer groove to prevent debris from accumulating therein. In addition, the retainer includes an expanded configuration wherein the debris shield is not configured to completely close off access to the aperture and the retainer groove.

As used herein, the terms "have," "may have," "include," "may include," "can have," or "can include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

FIGS. 1 through 23, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged system.

Embodiments of a system, method, assembly and apparatus for a conduit squeeze retainer are disclosed. For example, FIGS. 1-4 depict one version of an assembly includes a tubular body 21 having an axis 23, a bore 25 that is axial and a retainer groove 27 formed in the bore 25 of the tubular body 21. In a generic sense, the tubular body 21 can comprise a female receptacle on a component. For example, the component can be one of a pipe, a belled pipe, coupling, elbow, tee, sled tee, fitting, flange, cap, hose, flexible hose and electrical housing. In the illustrated embodiment, the tubular body 21 comprises a coupling, such as the tee coupling shown in FIGS. 1-4. In other embodiments, the tubular body 21 can comprise a pipe (not shown) that includes a spigot at one axial end and is belled at an opposite axial end to receive the spigot of another pipe.

Figure 1:
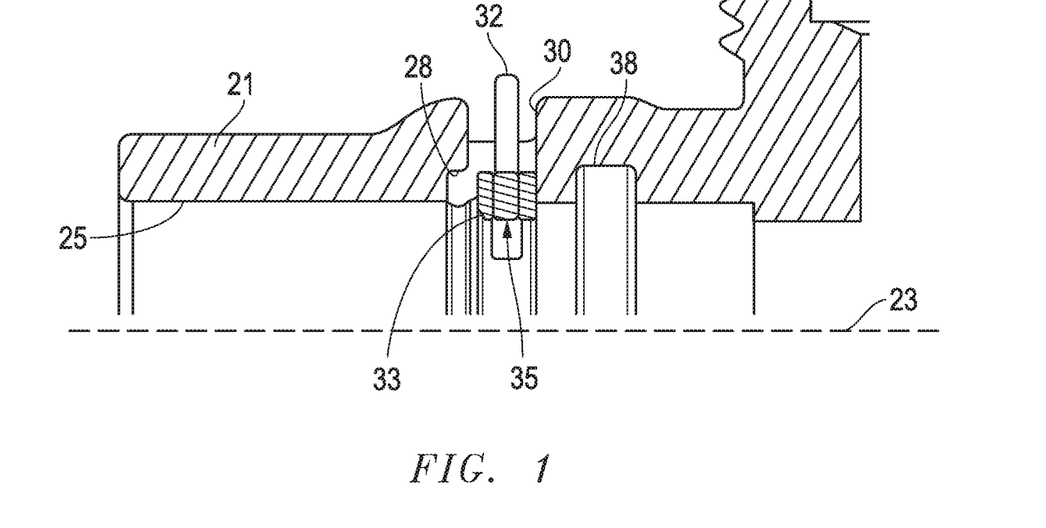
FIG. 1 is a sectional side view of an embodiment of an assembly with a retainer in an unlocked position.
Figure 2:
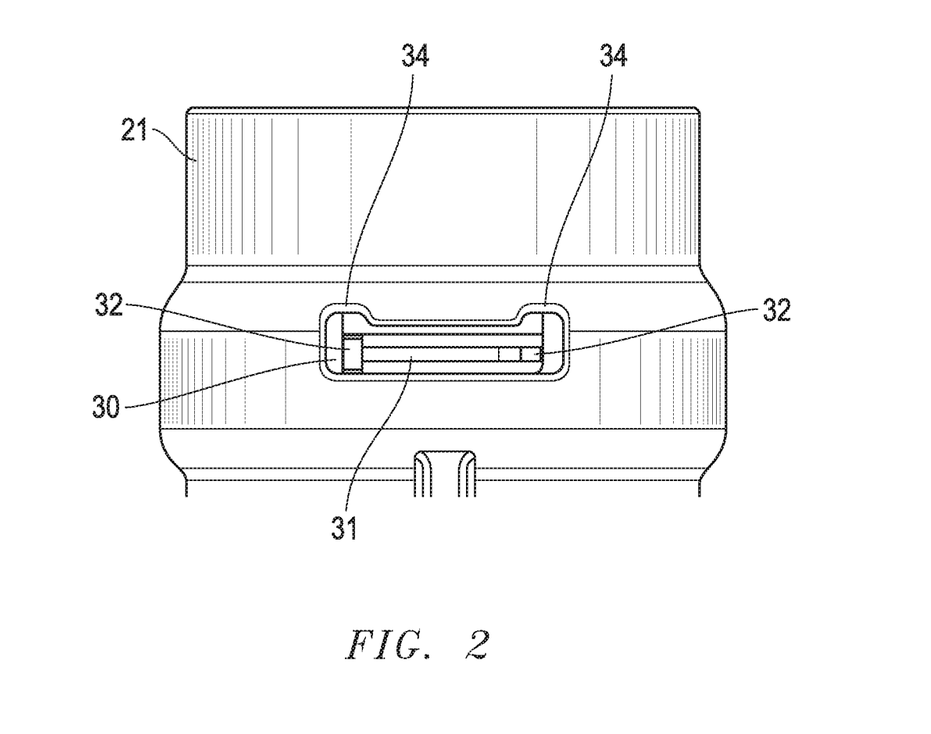
FIG. 2 is a top view of the assembly of FIG. 1.
Figure 3:
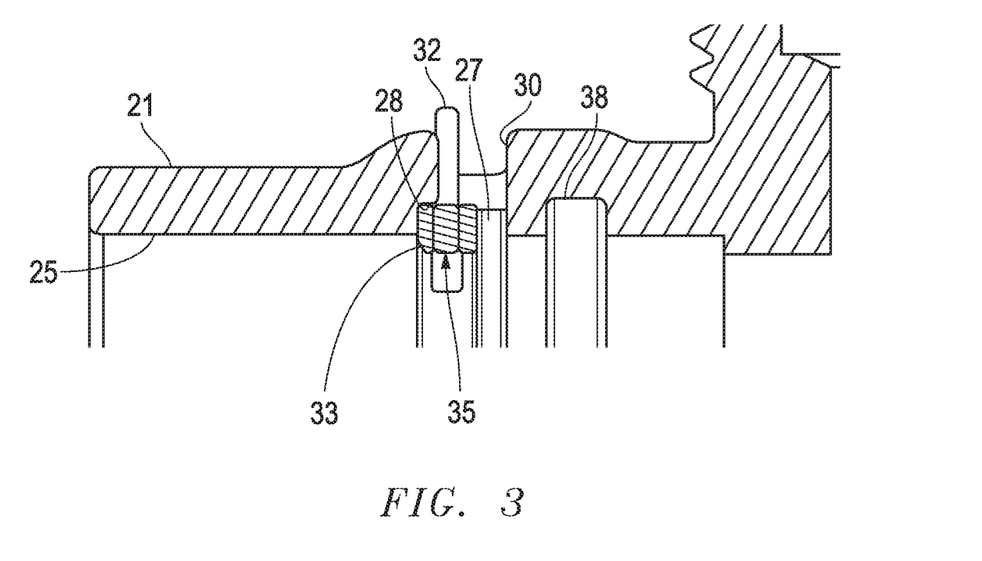
FIG. 3 is a sectional side view of the embodiment of FIG. 1 with the retainer in a locked position.
Figure 4:
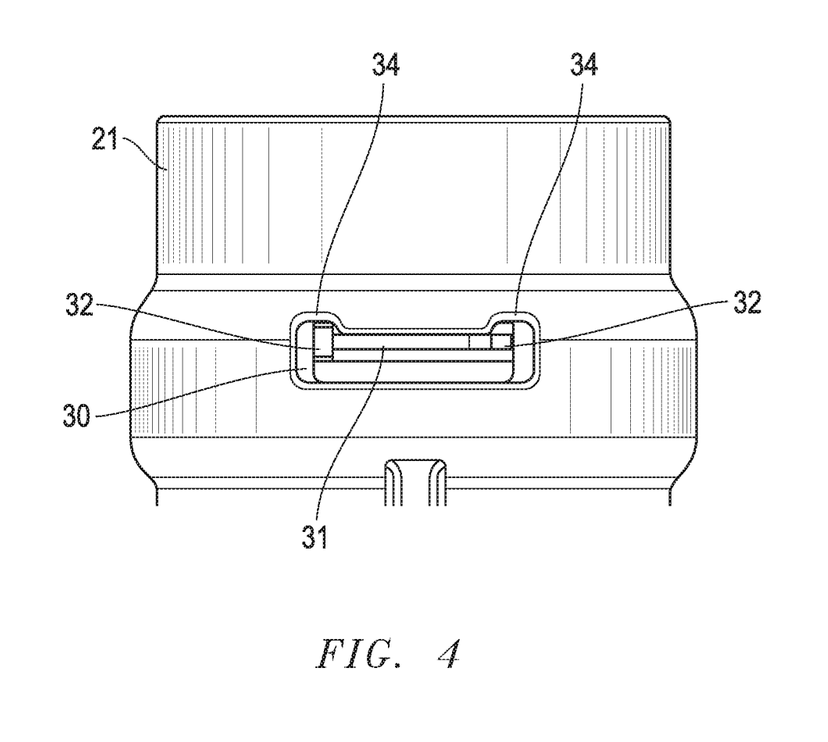
FIG. 4 is a top view of the assembly of FIG. 3.
Figure 5:
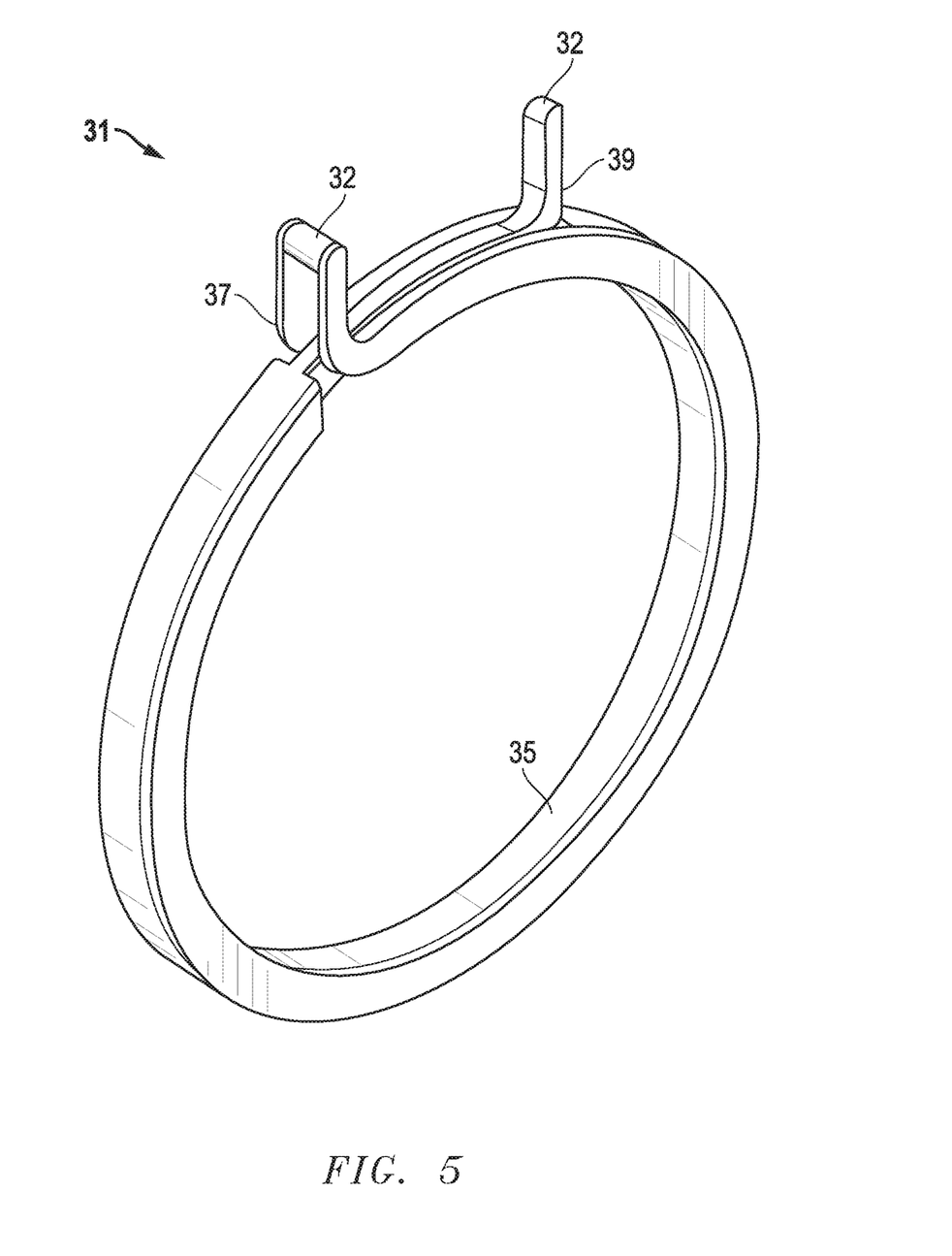
FIG. 5 is an isometric view of an embodiment of a retainer.
Figure 6:
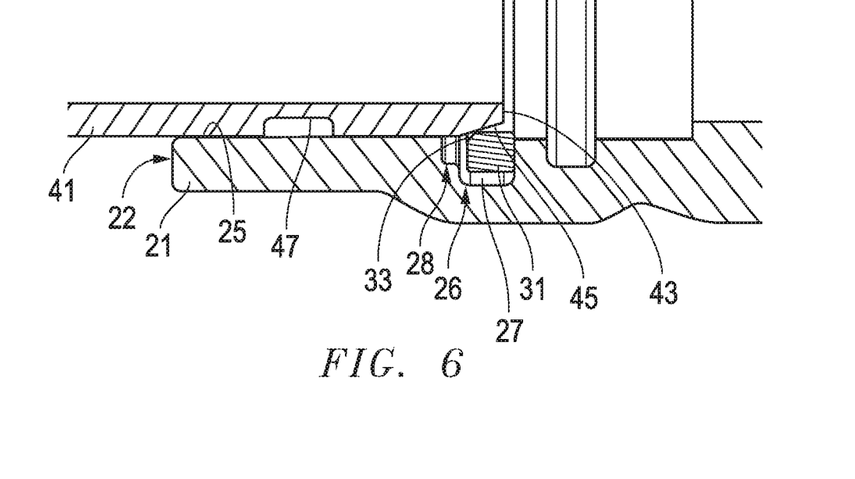
FIG. 6 is a sectional side view of an embodiment of a pipe system at an initial stage of contact between a pipe and a retainer in a coupling.
Figure 7:
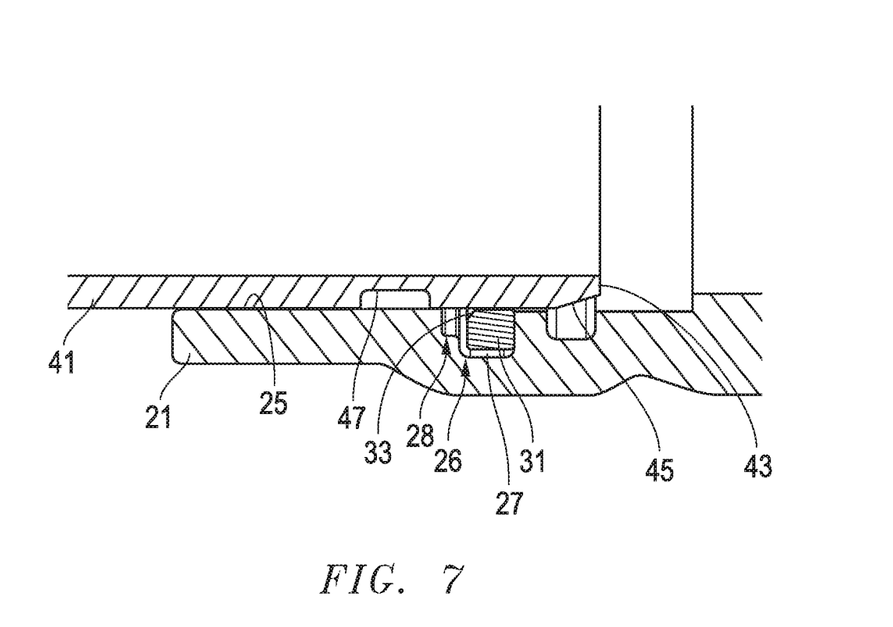
FIG. 7 is a sectional side view of the embodiment of the pipe system of FIG. 6 at an intermediate stage of contact between the pipe and the retainer in the coupling.
Figure 8:
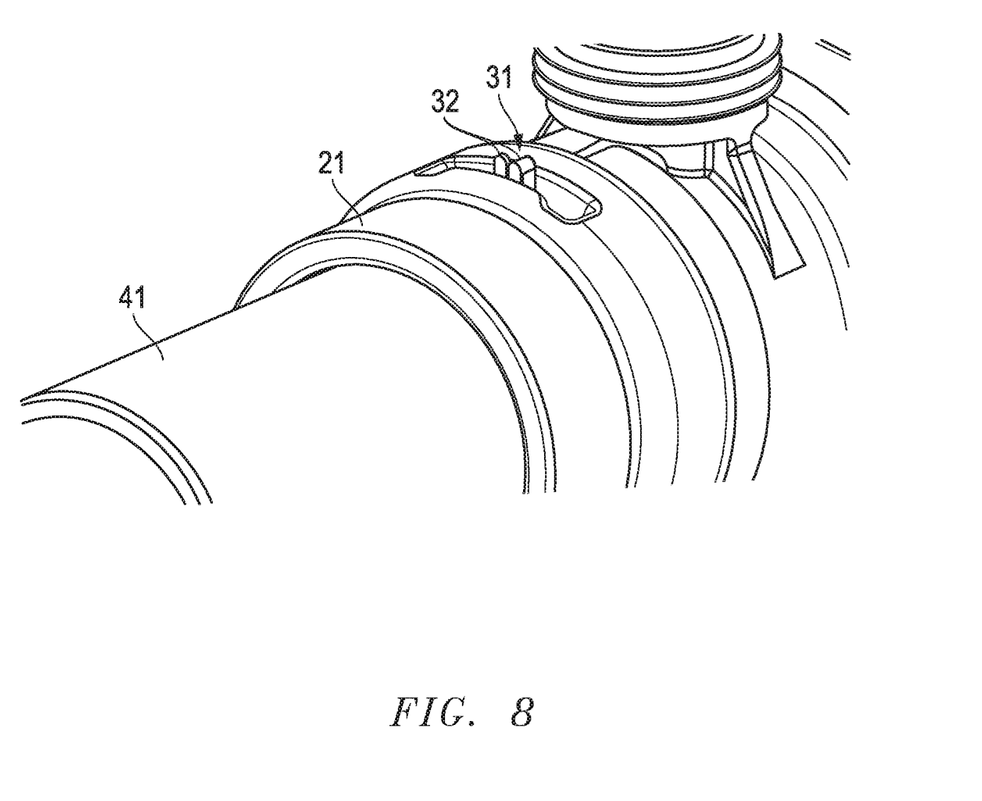
FIG. 8 is a top isometric view of the pipe system of FIG. 7.

A retainer 31 (FIGS. 1-5) can be mounted in the retainer groove 27. In one version, the retainer 31 comprises a spring clamp. In another version, the retainer 31 includes a radial sectional shape that is generally rectangular and has a chamfer 33 to facilitate insertion of the pipe 41 through the retainer 31. Embodiments of the retainer 31 can include a radial inner surface 35 having the chamfer 33 on a corner thereof configured to face in an axial direction of the pipe 41. As shown in FIG. 5, the retainer 31 can comprise a split ring with circumferentially overlapping ends 37, 39.

In some versions, an entirety of the retainer 31 can be configured to be both axially movable (compare FIGS. 1 and 3) and radially movable (compare FIGS. 6 and 7) relative to the retainer groove 27 during formation of a pipe assembly with a pipe 41 in the bore 25. In one example, the retainer 31 can comprise a clamp having a relaxed state (FIGS. 1, 3 and 6) at a first diameter, and a radially expanded state (FIGS. 7 and 8) with a second diameter that is greater than the first diameter.

Embodiments of the retainer 31 can be configured to comprise a sequence of configurations. For example, retainer 31 can comprise a nominal configuration (FIGS. 1 and 2) having a nominal diameter relative to the axis 23 prior to formation of the pipe assembly with the pipe 41. In addition, the retainer 31 can have an expanded configuration (FIGS. 7 and 8) having an expanded diameter relative to the axis 23 during formation of the pipe assembly. After formation of the pipe assembly, retainer 31 can have an engaged configuration (FIGS. 9 and 10) having an engaged diameter. In one example, the nominal diameter is less than (<) the engaged diameter less than (<) the expanded diameter. Alternatively, the retainer 31 can be configured to comprise another nominal configuration having the nominal diameter after formation of the pipe assembly. In another example, and in response to tension being applied to the pipe assembly, the retainer 31 can be configured to engage in the retainer groove 27 at a shallowest radial depth 28 (FIG. 11) thereof. Such a configuration can mitigate spline roll.

In one example, the retainer 31 automatically engages the pipe 41 when the pipe 41 is inserted into the bore 25 of the tubular body 21. That is, the retainer 31 is configured to engage the pipe without manual intervention when the pipe 41 is inserted into the bore 25 of the tubular body 21. In certain embodiments, the pipe can be inserted into the tubular body 21 either manually or with machine assistance. In addition, the pipe assembly can be reversible, such that manual actuation of the retainer 31 releases the pipe 41 from the tubular body 21. Moreover, the pipe assembly can be repeatably reversible such that the tubular body 21, retainer 31 and pipe 41 can repeatably form and un-form the pipe assembly.

Embodiments of the pipe 41 include an axial end 43 having a chamfer 45 (FIGS. 6 and 7) on an exterior thereof to facilitate insertion through the retainer 31. In certain embodiments, the pipe 31 also includes a pipe retainer groove 47. In one version (FIG. 13), only the pipe 41 is chamfered and the retainer 31 is not chamfered. In another version (FIG. 14), only the retainer 31 is chamfered and the pipe 41 is not chamfered. In certain embodiments, both the retainer 31 and the pipe 41 are chamfered.

In certain embodiments, the retainer 31 consists of a single retainer. That is, the retainer 31, as a single retainer, consists of only one retainer. The single (only one) retainer is the only retainer that is configured to retain the pipe 41 to the tubular body 21. In certain embodiments, the retainer 31 comprises a plurality of retainers. Each of the plurality of retainers can be mounted in a respective retainer groove 27 in the tubular body.

Figure 11:
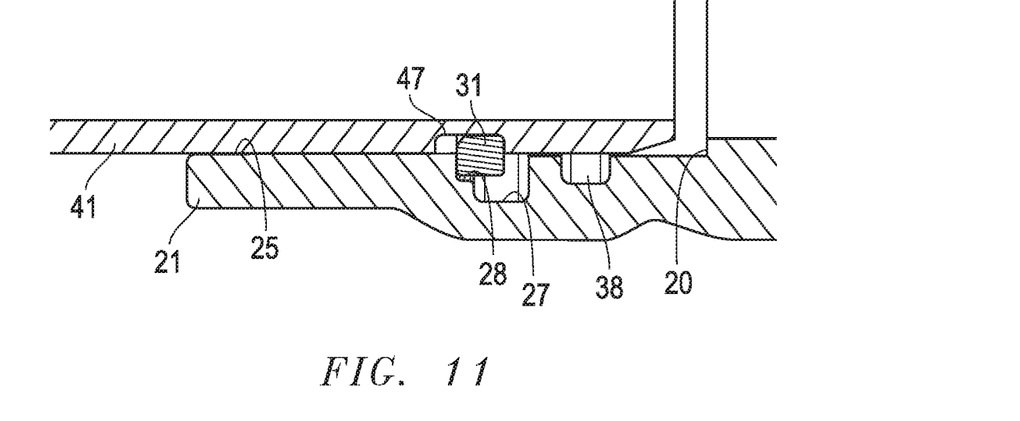
FIG. 11 is a sectional side view of the embodiment of the pipe system of FIG. 6 at a final stage of contact between the pipe and the retainer in the coupling.
Figure 12:
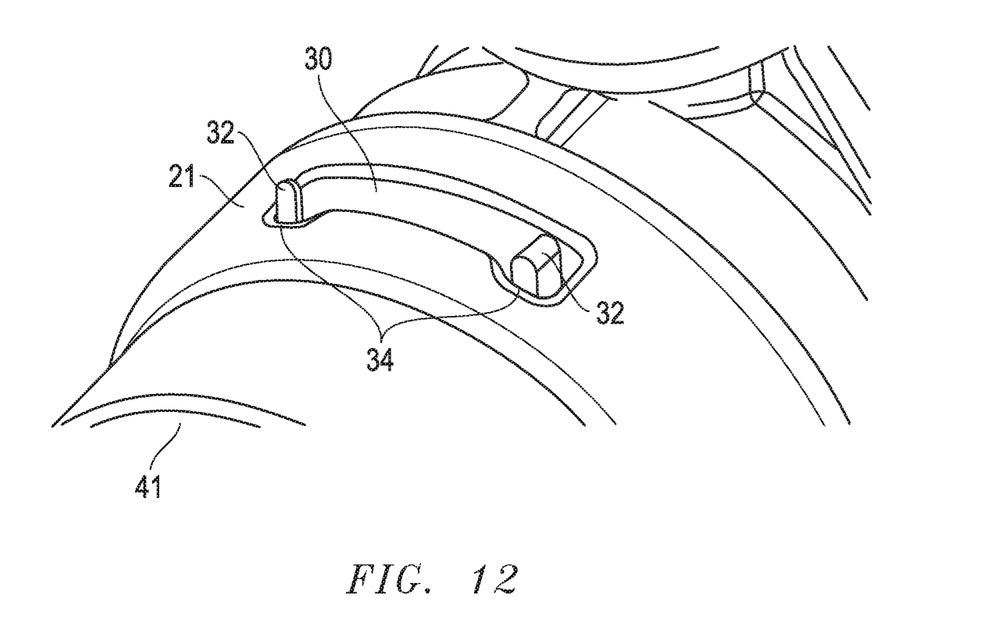
FIG. 12 is a top isometric view of the pipe system of FIG. 11.
Figure 13:
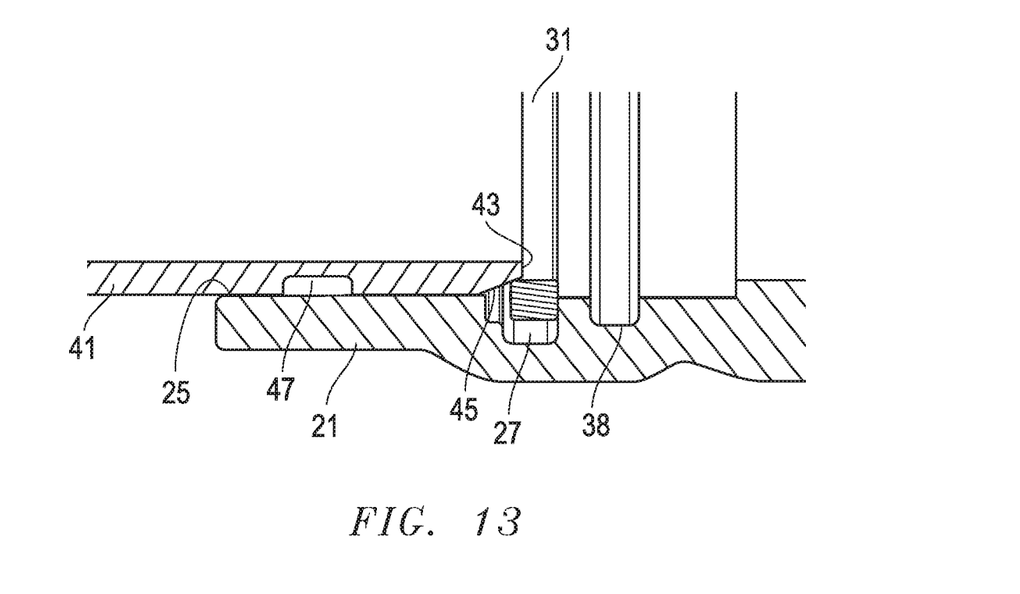
FIG. 13 is sectional side view of another embodiment of a pipe system.
Figure 14:
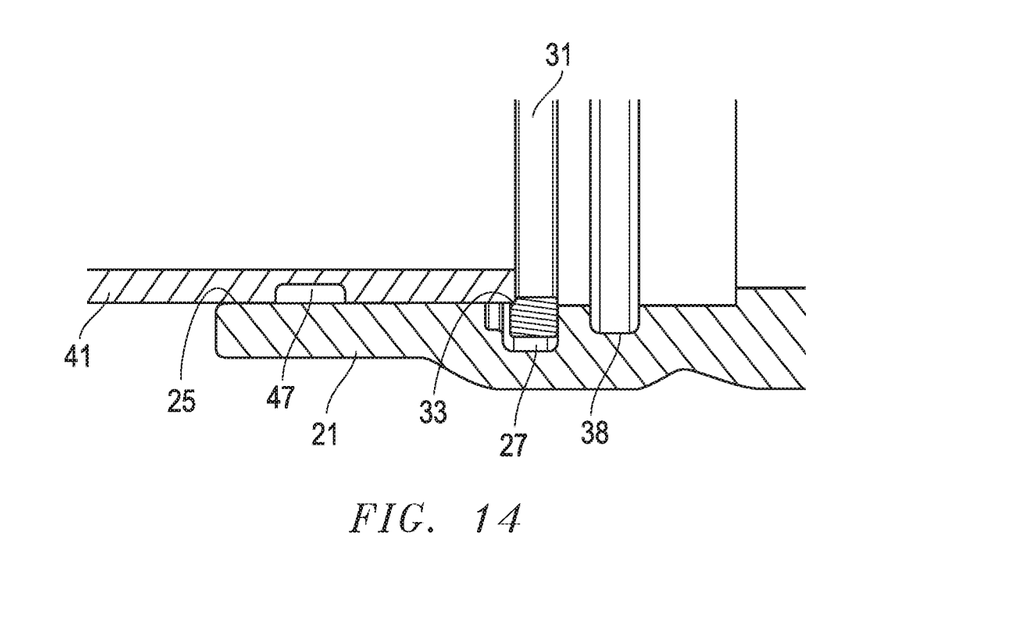
FIG. 14 is sectional side view of still another embodiment of a pipe system.
Figure 15:
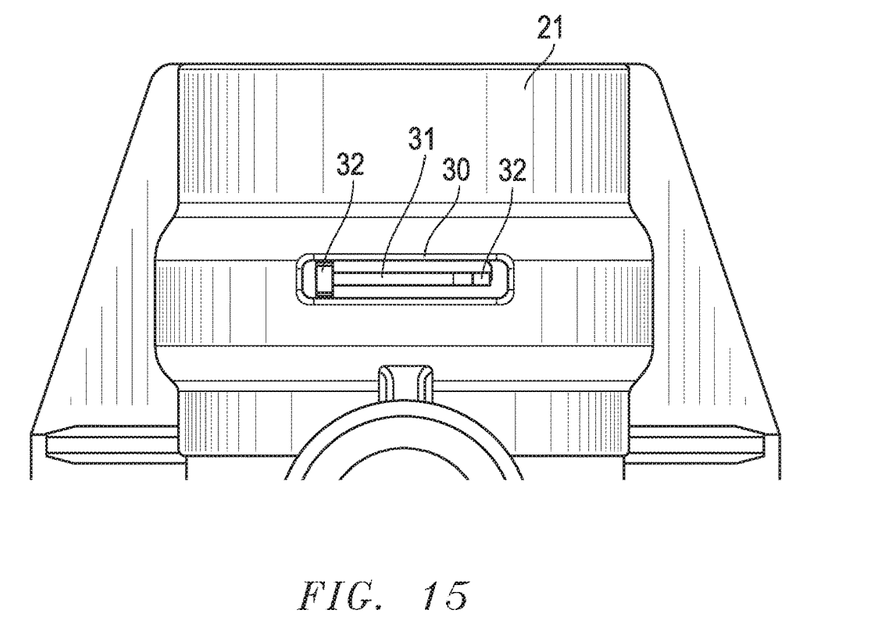
FIG. 15 is a top view of yet another embodiment of a pipe system.
Figure 16:
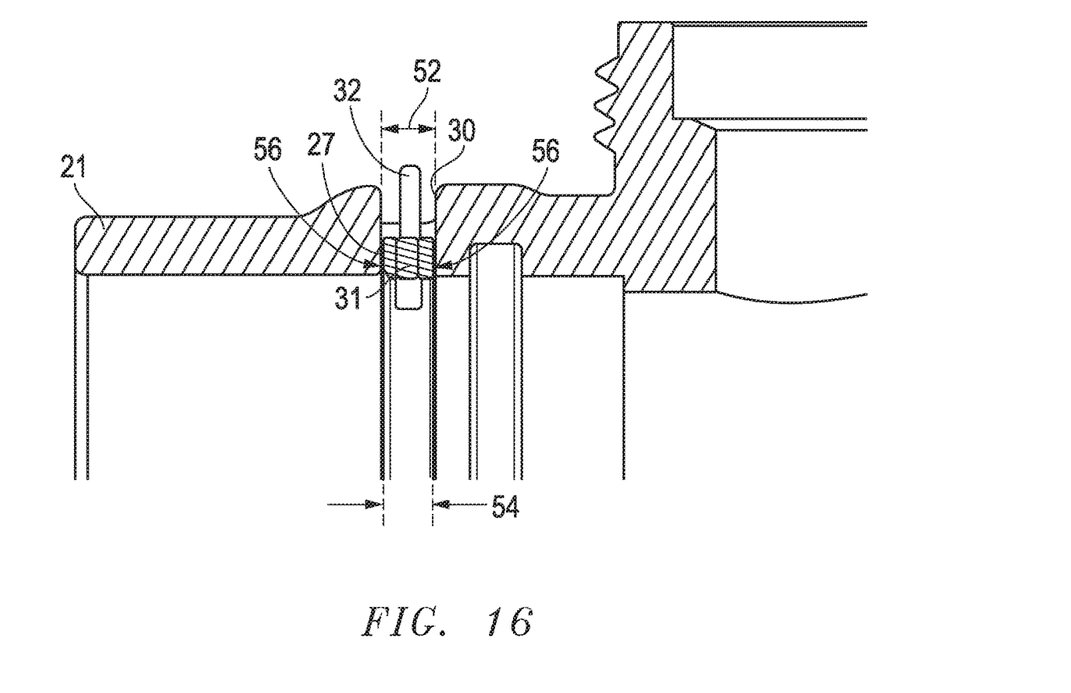
FIG. 16 is a sectional side view of the embodiment of FIG. 15.
Figure 17:
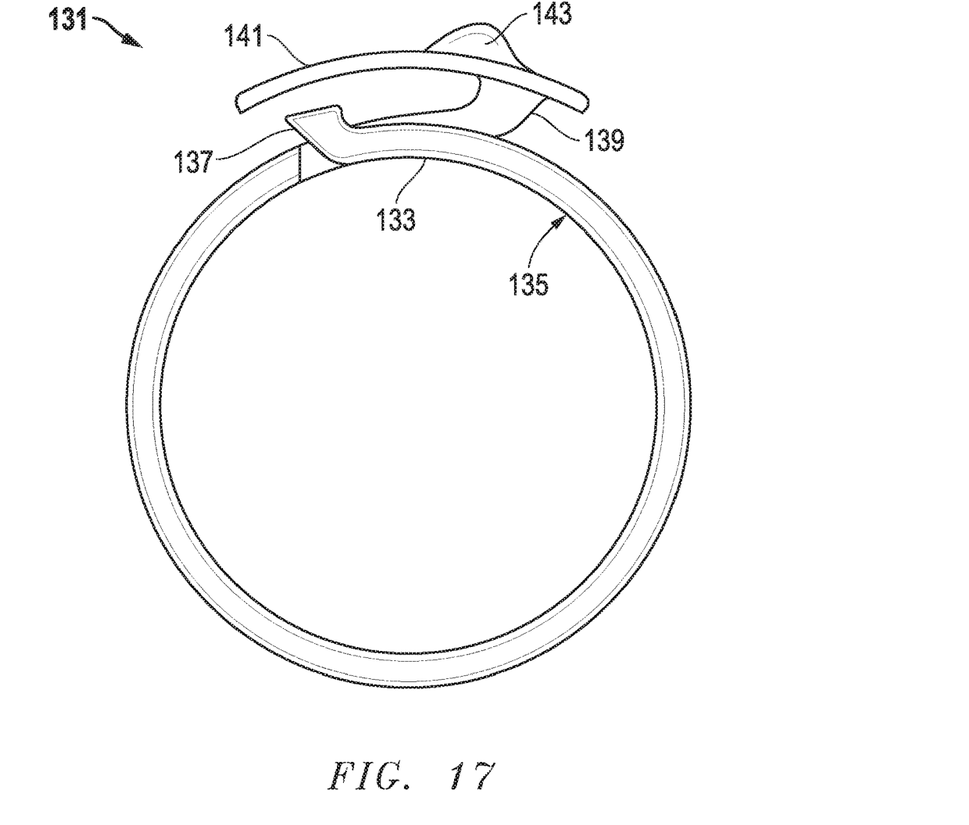
FIG. 17 is a front view of an alternate embodiment of a retainer.

Embodiments of the retainer 31 can include radial extensions 32 relative to the axis 23. The radial extensions 32 can be configured to be manipulated to change a dimension of the retainer 31. The radial extensions can be configured to be manually manipulated or manipulated by a tool or other instrument. The radial extensions 32 can extend to an exterior of the assembly. For example, the radial extensions 32 can extend through an aperture in a wall of the tubular body 21. As such, in certain embodiments, the assembly can include visual indicia (e.g., the radial extensions 32) to indicate: (a) if the retainer 31 has not engaged the pipe 41; (b) if the retainer 31 is not seated in the pipe retainer groove 47 (FIGS. 7 and 8); or (c) if the tubular body 21 and the pipe 41 are in tension (FIGS. 11 and 12). In one example, the radial extensions 32 are configured to only slidingly engage each other and do not lock together.

Some versions of the aperture 30 comprise recesses 34. In an example, the radial extensions 32 are configured to have an unrestrained position (FIGS. 1, 2, 8, and 10) in the aperture 30 in which the radial extensions are not in the recesses 34. In other versions, the radial extensions 32 can be configured to have a restrained position (FIGS. 3, 4, 11, and 12) in the recesses 34. The radial extensions 32 and the retainer 31 can be axially movable between the unrestrained and restrained positions. In certain embodiments, in the unrestrained position, the radial extensions 32 are circumferentially movable (e.g., compare FIGS. 6-8) and the retainer is radially movable. In certain embodiments, in the restrained position, the radial extensions 32 are not circumferentially movable relative to each other, and the retainer 31 is not radially movable. The radial extensions 32 extend out of the bore 25 and aperture 30 of the tubular body 21, such that one or more portions of the retainer 31 are exposed from an exterior of the tubular body 21. The radial extensions 32 can extend radially beyond an exterior surface of the tubular body 21.

Figure 9:
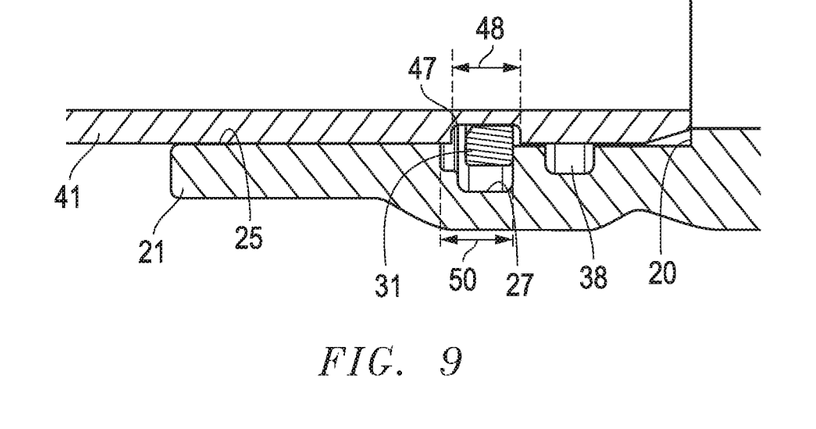
FIG. 9 is a sectional side view of the embodiment of the pipe system of FIG. 6 at an advanced stage of contact between the pipe and the retainer in the coupling.
Figure 10:
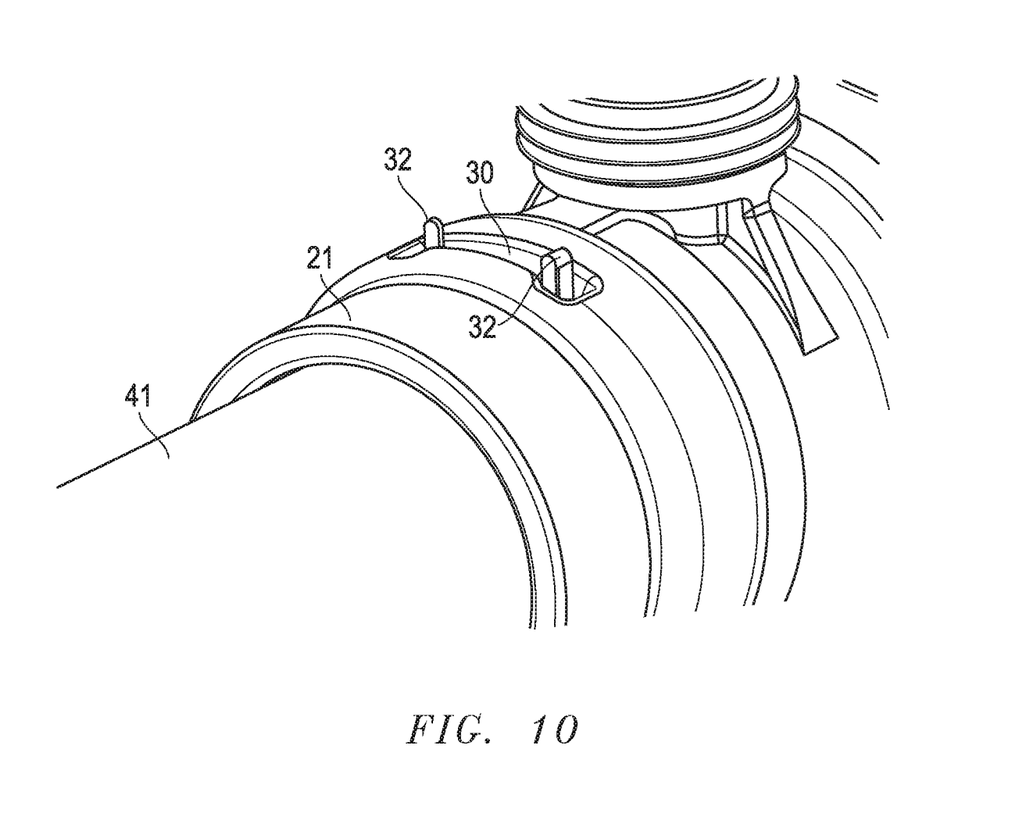
FIG. 10 is a top isometric view of the pipe system of FIG. 9.

Embodiments of the assembly can include all surfaces of the retainer 31 to be smooth, not textured, or not grooved, such as with teeth. In certain embodiments, all surfaces of the retainer groove 27 and a pipe retainer groove 47 of the pipe 41 are smooth and not textured, not grooved, such as with teeth. As shown in FIGS. 9 and 11, the pipe retainer groove 47 can be configured to receive a portion of the retainer 31. In the illustrated version, the pipe retainer groove 47 is on an exterior of the pipe 41, and the retainer groove 27 has an axial length 50 (FIG. 9) that is greater than (>) an axial length 48 of the pipe retainer groove 47. In certain examples, the pipe retainer groove axial length 48 is less than (<) the retainer groove axial length 50 by at least about 10% and not greater than about 50%. In another example, the axial length 48 of the pipe retainer groove 47 is greater than (>) the axial length 50 of the retainer groove 27. In still other embodiments (FIGS. 15 and 16), the retainer groove 27 is dimensioned to have a retainer groove axial length 52, and the retainer 31 has a retainer axial length 54 that is substantially similar to (e.g., slightly less than) the retainer groove axial length.

Embodiments of the retainer groove 27 can include a plurality of radial depths relative to the axis 23. In an example, the retainer groove 27 is located adjacent to an axial end 22 (FIG. 6) of the tubular body 21. The retainer groove 27 can include a deepest radial depth 26 located farthest from the axial end 22, a shallowest radial depth 28 located axially between the axial end 22 and the deepest radial depth 26. Additionally, the deepest radial depth 26 can be greater than (>) the shallowest radial depth 28.

In certain embodiments, the tubular body 21 includes a stop 20 (FIGS. 9 and 11) protruding radially inward from the bore 25. In an example, the bore 25 is smooth and comprises no teeth. In certain embodiments, the bore 25 consists of a single diameter, which does not include the retainer groove 27 and a seal groove 38 having a seal (not shown) configured to seal the tubular body 21 to the pipe 41, such as for liquid flow applications. In other examples, the assembly does not include a hydraulic seal.

Embodiments of a method of forming a pipe assembly also are disclosed. For example, the method can include providing a tubular body 21 with an axis 23, a bore 25 that is axial, and a retainer groove 27 formed in the bore 25. The method can include mounting a retainer 31 at a first radial depth 26 (FIG. 7) in the retainer groove 27, and inserting a pipe 41 into the bore 25 of the tubular body 21 and through the retainer 31 (compare FIGS. 6 and 7) until a pipe retainer groove 47 axially aligns (FIG. 9) with the retainer groove 27 in the tubular body 21, such that the retainer 31 seats in the pipe retainer groove 47. The method can further include axially removing at least a portion of the pipe 41 (FIG. 11) from the tubular body 21 such that the retainer 31 moves axially to a second radial depth 28 of the retainer groove 27 that is radially shallower than the first radial depth 26 to form the pipe assembly.

In certain embodiments, a method of forming a pipe assembly can include inserting the pipe 41 into the bore 25 of the tubular body 21 and through the retainer 31 (compare FIGS. 6 and 7) such that the retainer 31 is automatically radially expanded by the pipe 41 without manual intervention. The method also can include inserting the pipe 41 into the bore 25 until the pipe retainer groove 47 axially aligns with the retainer groove 27 in the tubular body 21, such that the retainer 31 seats in the pipe retainer groove 47 and forms the pipe assembly, such as in the example of FIGS. 15 and 16.

In versions for some applications, the retainer groove 27, retainer 31 and the pipe retainer groove 47 in the pipe 41 are parallel to each other and perpendicular to the axis 23. In addition, the retainer 31 can comprise a split ring. Certain embodiments can include the outer axial-facing surfaces 56 (FIG. 16) of both ends of the retainer 31 that are co-planar.

FIGS. 17-23 depict alternate embodiments of a retainer 131. The retainer 131 (FIGS. 17 and 18) can comprise a spring clamp. In certain embodiments, the retainer 131 includes a radial sectional shape that is generally rectangular and has a bevel or chamfer 133 (FIGS. 22 and 23) to facilitate insertion of a pipe through the retainer 131. Embodiments of the retainer 131 can include a radial inner surface 135 having the chamfer 133 on a corner thereof configured to face in an axial direction of the pipe. In certain embodiments, the retainer 131 includes a split ring with circumferentially overlapping ends 137, 139. In certain embodiments, as shown in the example illustrated in FIG. 18, the retainer 131 includes radial extensions 132, 134 relative to the axis.

Figure 18:
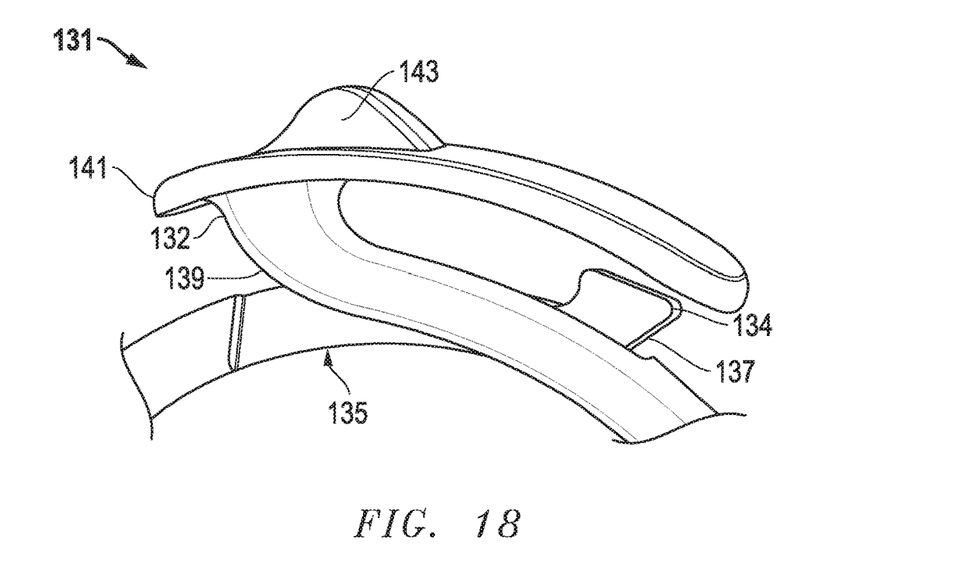
FIG. 18 is a top, front isometric view of the embodiment of the retainer of FIG. 17.

In the example depicted in FIG. 18, a debris shield 141 protrudes from one of the radial extensions 132, 134. The debris shield 141 extends from a radial extension 132 toward and above radial extension 134. The debris shield 141 can include a generally arcuate panel having an axial width that exceeds a radial thickness thereof, and a circumferential length that significantly exceeds its radial thickness. The radial extension 134 can limit the radial inward movement of the distal end of debris shield 141. In addition, the debris shield 141 can include one or more actuator features, such as one or more protrusions 143 (FIGS. 17-18), one or more grip features 145 (FIG. 21) and the like. The actuator features can be used to actuate retainer 131 as described elsewhere herein.

Figure 19:
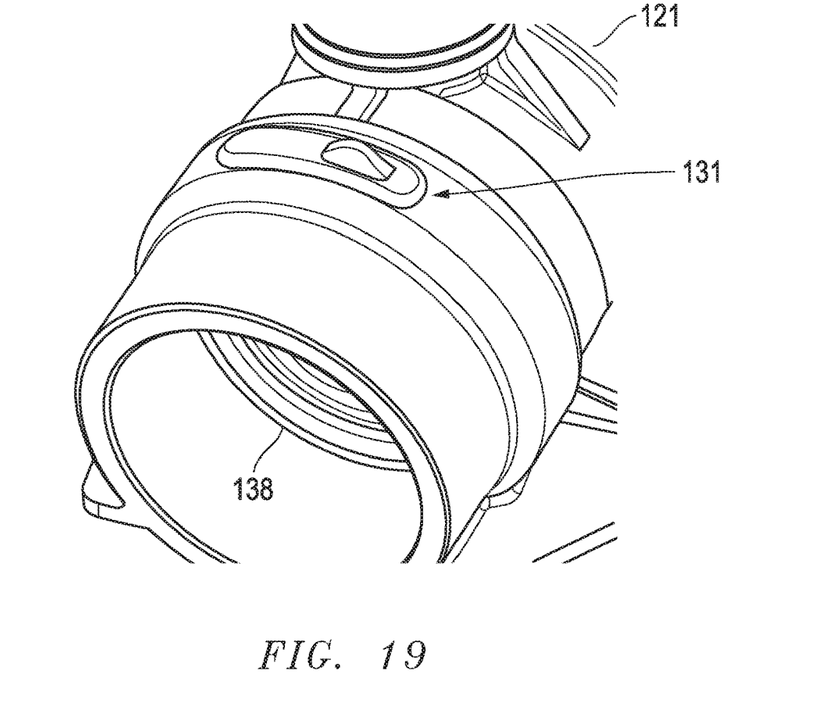
FIG. 19 is a top, front isometric view of the embodiment of the retainer of FIGS. 17 and 18 shown installed in a coupling, with the retainer in a relaxed configuration.
Figure 20:
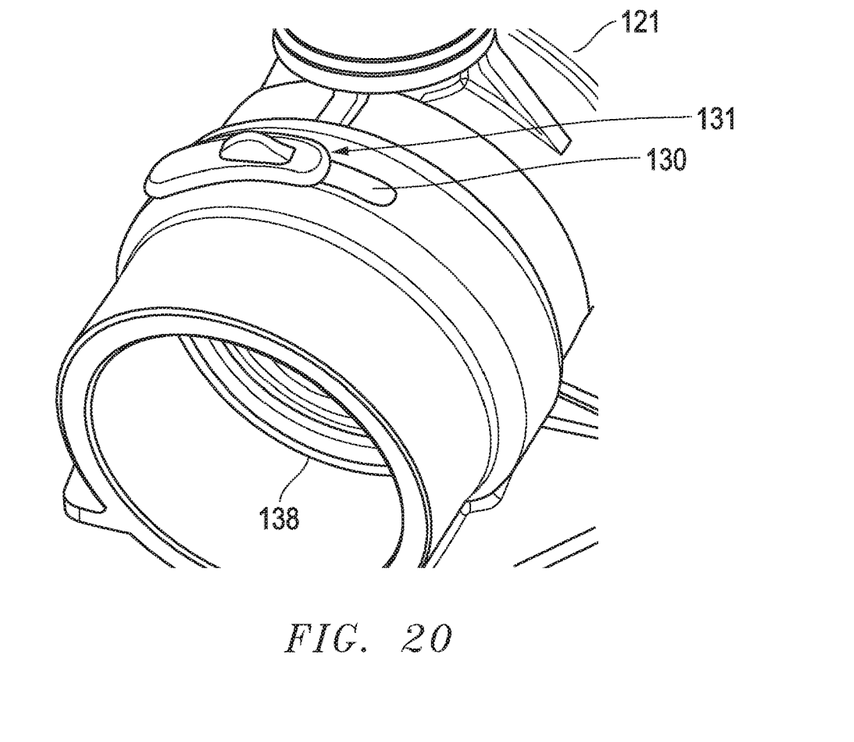
FIG. 20 is a top, front isometric view of the retainer and coupling of FIG. 19, with the retainer in an expanded configuration.
Figure 21:
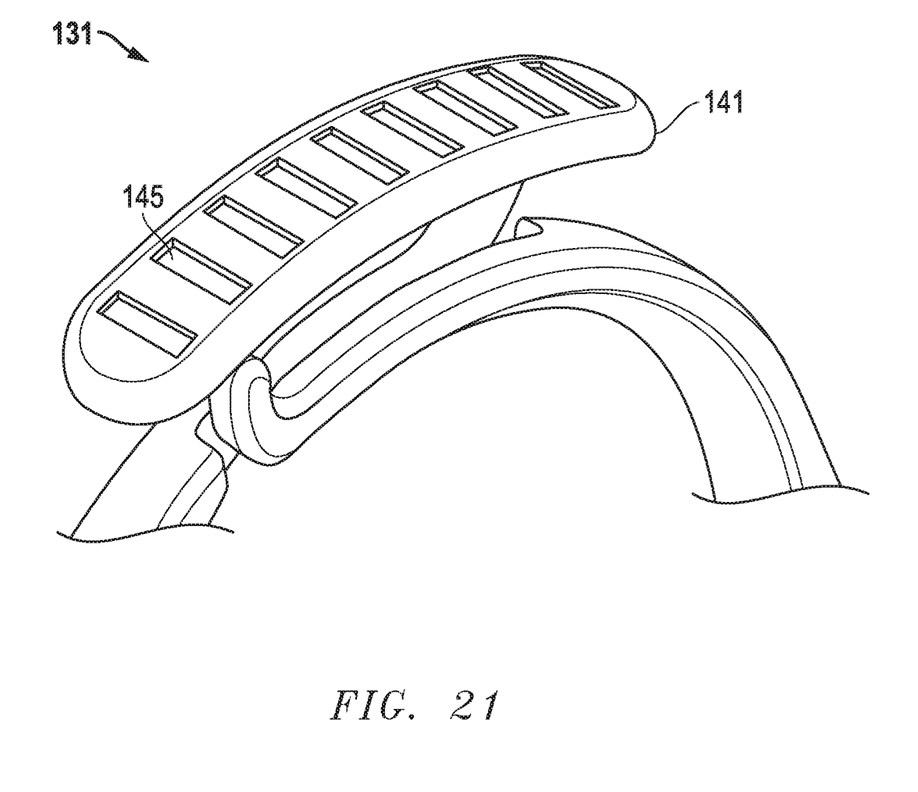
FIG. 21 is a top, rear isometric view of an alternate embodiment of the retainer of FIGS. 17-20.

As shown in FIGS. 19 and 20, the retainer 131 can be mounted in a tubular body 121. In certain embodiments, the retainer 131 is installed from an exterior of tubular body 121 by inserting end 137 into an aperture 130 in a wall of the tubular body 121 to form an assembly. The aperture 130 is contiguous with a retainer groove 138 (FIG. 23) formed in the tubular body 121. The debris shield 141 and actuator features can be configured to be manipulated (e.g., manually or with a tool) to change a dimension (e.g., a diameter) of the retainer 131 since the debris shield 131 extends to an exterior of the assembly.

Embodiments of the retainer 131 can be configured to comprise a sequence of configurations. For example in FIGS. 17-19, the retainer 131 can comprise a nominal or relaxed (i.e., unbiased) configuration having a nominal diameter relative to the axis prior to formation of the pipe assembly with the pipe. In the nominal configuration, the debris shield 141 is configured to close off access to the aperture 130 and retainer groove to prevent debris (e.g., dirt) from accumulating therein. In addition, the retainer 131 can have an expanded configuration (FIG. 20) having an expanded (i.e., larger) diameter relative to the axis during formation or disassembly of the pipe assembly. In the expanded configuration, the debris shield 141 is not configured to completely close off access to the aperture 130 and retainer groove. The retainer 131 and tubular body 121 also can be configured as described elsewhere herein for other embodiments.

Figure 22:
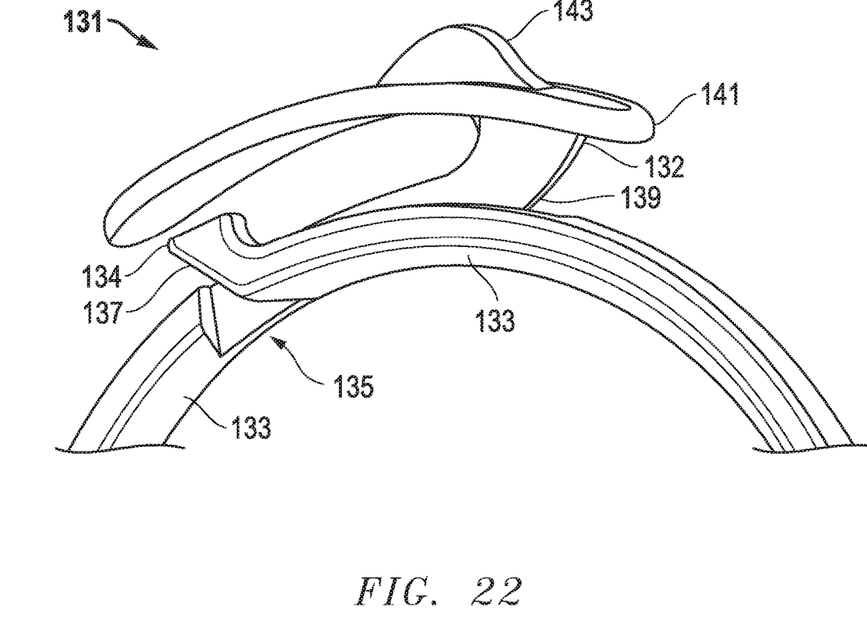
FIG. 22 is a top, rear isometric view of the embodiment of the retainer of FIG. 17.
Figure 23:
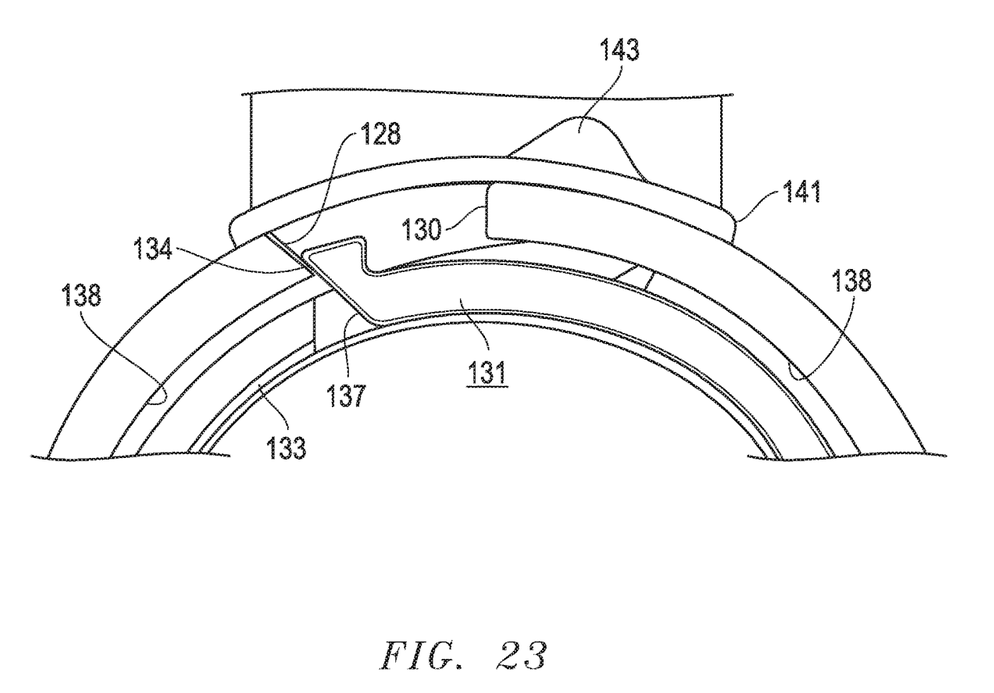
FIG. 23 is a sectional end view of the retainer and coupling of FIG. 19, with the retainer in the relaxed configuration.

As shown in FIGS. 22 and 23, the radial extension 134 can be sloped to help retain retainer 131 in desired positions. For example, the radial extension 134 can radially move the end 137 of the retainer 131 through contact with an angled surface 128 on the aperture 130 of the retainer groove 138 of the tubular body 121. In FIG. 23, the debris shield 141 is slightly biased to from the right to the left. Actuation of the retainer 131 at this position causes: (1) the retainer 131 to transition into an expanded, larger diameter state; (2) the radial extension 134 to slide along angled surface 128; and (3) expands the retainer 131 to the larger diameter. In addition, the radial extension 134 can prevent the end 137 from interfering with a pipe's (not shown) retainer groove on a male end of the pipe upon disassembly of the pipe from the tubular body 121.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. An assembly, comprising:
    a tubular body having an axis, a bore that is axial, an aperture through the tubular body, and a retainer groove formed in the bore of the tubular body;
    a retainer mounted in the retainer groove, wherein an entirety of the retainer is configured to be both axially movable and radially movable relative to the retainer groove during formation of a pipe assembly with a pipe in the bore; and
    a debris shield located on an exterior of the tubular body, wherein the retainer comprises
        a nominal configuration wherein the debris shield is configured to close off access to the aperture and the retainer groove to prevent debris from accumulating therein, and
        an expanded configuration wherein the debris shield is configured to not completely close off access to the aperture and the retainer groove,
    wherein the debris shield is coupled to a first radial extension of the retainer, extends circumferentially toward, is spaced from, and is disposed radially outward relative to a second radial extension of the retainer, wherein the first and second radial extensions are circumferentially closer to one another with the retainer in the expanded configuration and circumferentially further away from one another in the nominal configuration.

2. The assembly of claim 1, wherein the retainer comprises a spring clamp.

3. The assembly of claim 1, wherein the retainer comprises a radial sectional shape that is rectangular and is chamfered to facilitate insertion of the pipe through the retainer.

4. The assembly of claim 1, wherein the retainer comprises a radial inner surface having a chamfer on a corner thereof configured to face in an axial direction of the pipe.

5. The assembly of claim 1, wherein the retainer comprises a split ring with circumferentially overlapping ends.

6. The assembly of claim 1, wherein the radially extensions are configured to be manipulated to change a dimension of the retainer.

7. The assembly of claim 6, wherein the radial extensions are configured to only slidingly engage each other and do not lock together.

8. The assembly of claim 6, wherein the radial extensions extend through the aperture in a wall of the tubular body.

9. The assembly of claim 8, wherein the aperture comprises recesses, the radial extensions are configured to have an unrestrained position in the aperture, and the radial extensions are configured to have a restrained position in the recesses.

10. The assembly of claim 9, wherein the radial extensions and the retainer are axially movable between the unrestrained and restrained positions.

11. The assembly of claim 9, wherein, in the unrestrained position the radial extensions are circumferentially movable and the retainer is radially movable, and in the restrained position the radial extensions are not circumferentially movable and the retainer is not radially movable.

12. The assembly of claim 6, wherein the radial extensions extend out of the bore of the tubular body such that a portion of the retainer is exposed from an exterior of the tubular body.

13. The assembly of claim 6, wherein the radial extensions extend radially beyond an exterior surface of the tubular body.

14. The assembly of claim 1, wherein the debris shield comprises a generally arcuate panel having an axial width that exceeds a radial thickness thereof, and a circumferential length that exceeds its radial thickness.

15. The assembly of claim 1, wherein the debris shield comprises at least one actuator feature to manipulate a diameter of the retainer.

16. The assembly of claim 15, wherein the at least one actuator comprises a protrusion or a grip feature.

* * * * *